United States Patent
Barainca et al.

(10) Patent No.: US 10,533,456 B2
(45) Date of Patent: Jan. 14, 2020

(54) STATOR ASSEMBLY WITH CONTOURED RETENTION CLIP FOR GAS TURBINE ENGINE

(71) Applicant: United Technologies Corporation, Farmington, CT (US)

(72) Inventors: Brian Barainca, Kennebunk, ME (US); Paul W. Baumann, Amesbury, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 294 days.

(21) Appl. No.: 15/605,991

(22) Filed: May 26, 2017

(65) Prior Publication Data
US 2018/0340448 A1    Nov. 29, 2018

(51) Int. Cl.
*F01D 9/04* (2006.01)
*F01D 25/24* (2006.01)
*F01D 5/30* (2006.01)

(52) U.S. Cl.
CPC ......... *F01D 25/246* (2013.01); *F01D 5/3023* (2013.01); *F01D 9/042* (2013.01)

(58) Field of Classification Search
CPC ...... F01D 25/246; F01D 9/042; F01D 5/3023; F05D 2260/31; F05D 2260/38; F05D 2260/36; F05D 2250/75
See application file for complete search history.

(56) References Cited

U.S. PATENT DOCUMENTS

| 2,812,159 | A | | 11/1957 | Krebs |
| 5,399,069 | A | * | 3/1995 | Marey ............... F01D 9/042 415/189 |
| 6,409,472 | B1 | | 6/2002 | McMahon et al. |
| 6,655,912 | B2 | | 12/2003 | Bos |
| 8,966,756 | B2 | | 3/2015 | Feigleson et al. |

FOREIGN PATENT DOCUMENTS

| EP | 2072760 | 6/2009 |
| EP | 3406855 | 11/2018 |
| WO | 2014137457 | 9/2014 |

OTHER PUBLICATIONS

European Search Report for European Patent Application No. 18173432 completed Jan. 15, 2019.

* cited by examiner

*Primary Examiner* — Eldon T Brockman
(74) *Attorney, Agent, or Firm* — Carlson, Gaskey & Olds, P.C.

(57) ABSTRACT

A stator assembly of a gas turbine engine according to an example of the present disclosure includes, among other things, a first shroud that extends about an axis to bound a flow path. The first shroud defines a first shroud opening. An airfoil has an airfoil body that extends from a first end portion. The first end portion is received in the first shroud opening and defines a pair of airfoil openings. At least one retention clip has an intermediate portion connecting a pair of elongated leg portions. The pair of elongated leg portions are received in the pair of airfoil openings such that the at least one retention clip limits movement of the airfoil relative to the first shroud. A method of assembling a stator assembly is also disclosed.

22 Claims, 6 Drawing Sheets

STATOR ASSEMBLY WITH CONTOURED RETENTION CLIP FOR GAS TURBINE ENGINE

BACKGROUND

This application relates to retention of components for a gas turbine engine, such as retention of a stator assembly.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section to extract energy for driving the fan.

Gas turbine engines typically include a stator assembly including airfoils to guide flow through a flow path. The airfoils are secured to portions of the stator assembly.

SUMMARY

A stator assembly of a gas turbine engine according to an example of the present disclosure includes a first shroud that extends about an axis to bound a flow path. The first shroud defines a first shroud opening. An airfoil has an airfoil body that extends from a first end portion. The first end portion is received in the first shroud opening and defines a pair of airfoil openings. At least one retention clip has an intermediate portion connecting a pair of elongated leg portions. The pair of elongated leg portions are received in the pair of airfoil openings such that the at least one retention clip limits movement of the airfoil relative to the first shroud.

In a further embodiment of any of the foregoing embodiments, the intermediate portion includes at least one undulation that engages a ridge of the first end portion when the at least one retention clip is located in an installed position.

In a further embodiment of any of the foregoing embodiments, the at least one undulation includes a pair of undulations each substantially aligned with a respective one of the pair of elongated leg portions.

In a further embodiment of any of the foregoing embodiments, the intermediate portion spans between the pair of airfoil openings when the at least one retention clip is located in the installed position.

In a further embodiment of any of the foregoing embodiments, the intermediate portion is connected to each of the pair of elongated leg portions by a pair of C-shaped bends that bias the intermediate portion toward the pair of elongated leg portions.

In a further embodiment of any of the foregoing embodiments, each leg portion of the pair of elongated leg portions and the intermediate portion have an elliptical cross section.

A further embodiment of any of the foregoing embodiments include a secondary retention member formed adjacent to the first end portion to trap the at least one retention clip.

In a further embodiment of any of the foregoing embodiments, the secondary retention member comprises an elastomer material.

In a further embodiment of any of the foregoing embodiments, the first shroud bounds a radially inner portion of the flow path, and a second shroud bounds a radially outer portion of the flow path.

In a further embodiment of any of the foregoing embodiments, the stator assembly is situated in a bypass duct.

A gas turbine engine according to an example of the present disclosure includes a fan section that has a plurality of fan blades rotatable about an engine axis, a compressor section in fluid communication with the fan section, a turbine section driving the fan section, and a stator assembly that has a first shroud and a second shroud each extending about the engine axis. The first shroud defines an array of first openings, and the second shroud defining an array of second openings. A plurality of airfoils each have an airfoil body that extends between first and second end portions. The first end portion is situated in a respective one of the array of first openings, and the second end portion situated in a respective one of the array of second openings. A plurality of retention clips each have an intermediate portion connecting a pair of leg portions. The intermediate portion has at least one undulation, and each first end portion receives a respective one of the plurality of retention clips to limit movement of the plurality of airfoils.

In a further embodiment of any of the foregoing embodiments, the stator assembly is situated in a bypass flow path aft of the fan section.

In a further embodiment of any of the foregoing embodiments, the stator assembly is an inlet guide vane assembly forward of the compressor section.

A further embodiment of any of the foregoing embodiments include a secondary retention member formed adjacent to each first end portion to trap the plurality of retention clips.

In a further embodiment of any of the foregoing embodiments, the first shroud bounds a radially inner portion of a flow path, and the second shroud bounds a radially outer portion of the flow path.

A method of assembling a stator assembly of a gas turbine engine according to an example of the present disclosure includes providing a shroud that defines a shroud opening, and moving an end portion of an airfoil into the shroud opening. The end portion defines a pair of airfoil opening. The method includes the step of moving a pair of leg portions of a retention clip into the pair of airfoil openings such that the retention clip limits movement of the airfoil relative to the shroud.

In a further embodiment of any of the foregoing embodiments, the retention clip includes an intermediate portion connecting the pair of leg portions. The intermediate portion has a plurality of undulations.

In a further embodiment of any of the foregoing embodiments, the step of moving the pair of leg portions includes simultaneously sliding the pair of leg portions a distance through the pair of airfoil openings such that the plurality of undulations sit along a ridge of the end portion.

A further embodiment of any of the foregoing embodiments includes forming a secondary retention member adjacent to the end portion to encase at least a portion of the retention clip and oppose withdraw of the pair of leg portions from the pair of airfoil openings.

In a further embodiment of any of the foregoing embodiments, the airfoil is situated in a bypass flow path.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
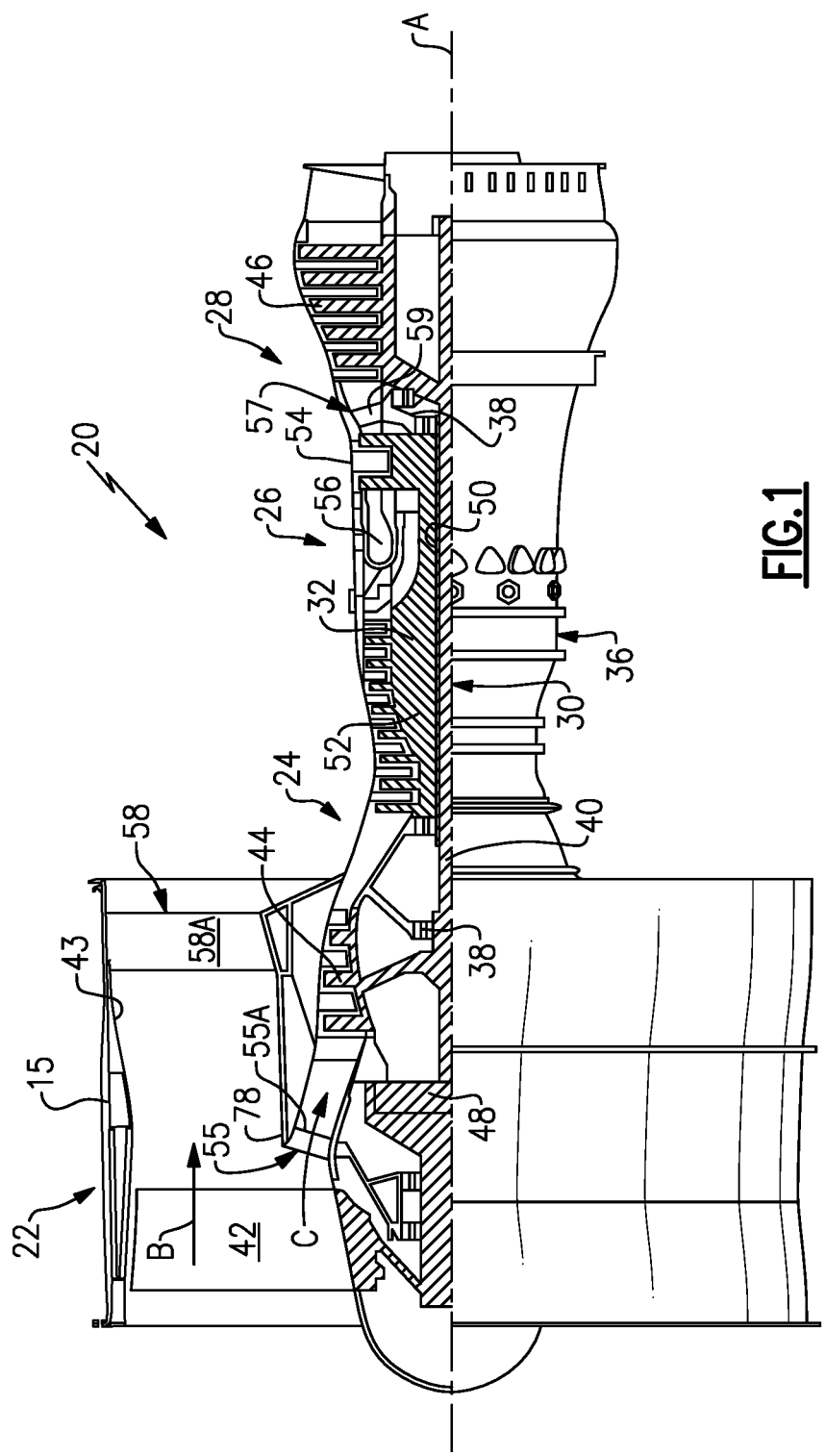
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10.668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

The engine 20 can include a structural guide vane (SGV) or bypass guide vane system 58 situated aft of the fan 42 in a bypass duct 43 defining the bypass flow path B. The bypass guide vane system 58 can include a plurality of airfoils 58A (one shown in FIG. 1) extending radially between an inner diameter and outer diameter of the bypass duct 43.

The engine 20 can include a fan exit stator (FES) or inlet guide vane assembly 55 downstream of the fan 42 and radially inward of a splitter 78. The inlet guide vane assembly 55 directs flow along the core flow path C from the fan 42 into the compressor section 24. The inlet guide vane assembly 55 can include a plurality of airfoils 55A (one shown in FIG. 1) arranged circumferentially about the engine central longitudinal axis A.

FIGS. 2-5 illustrate an example stator assembly 60 for guiding airflow through a flow path. In some examples, the stator assembly 60 is a portion of the inlet guide vane assembly 55 and/or the bypass guide vane system 58. The stator assembly 60 can also be utilized in the compressor section 24, turbine section 28 or mid-turbine frame 57. Other portions and components of the engine 20 can also benefit from the teachings herein, such as retention of combustor panels in the combustor section 26 or blade outer air seals (BOAS) in the turbine section 28.

Figure 2:
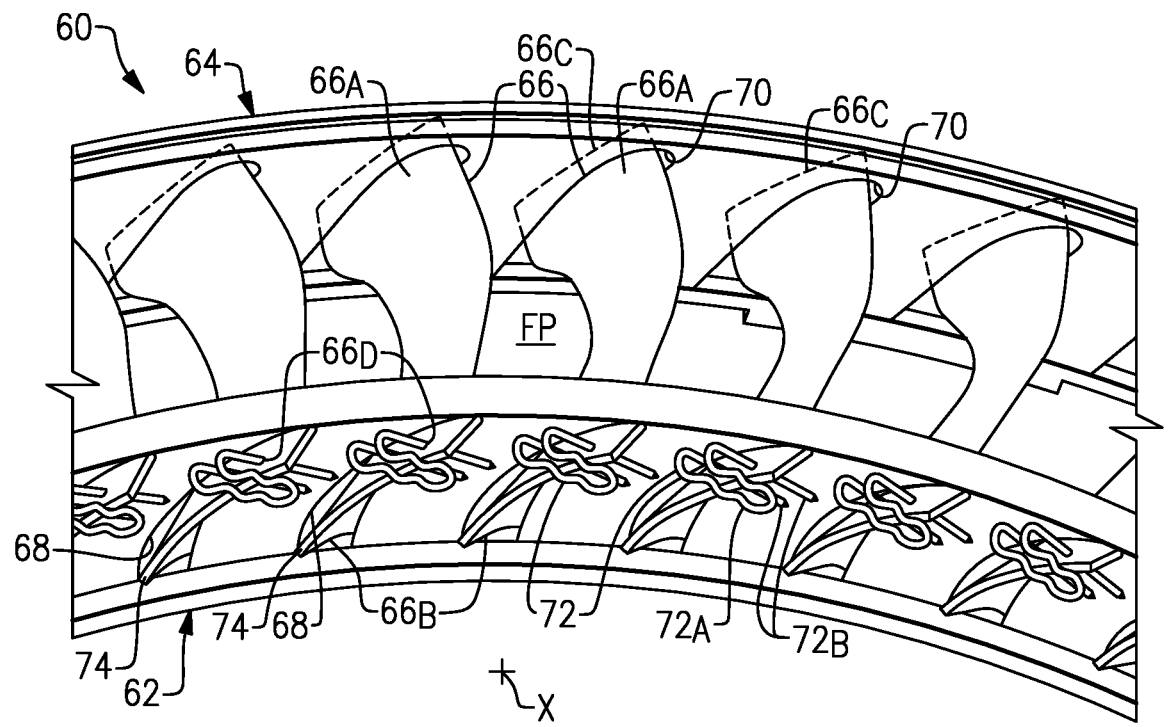
FIG. 2 illustrates a perspective view of an example stator assembly.
Figure 3:
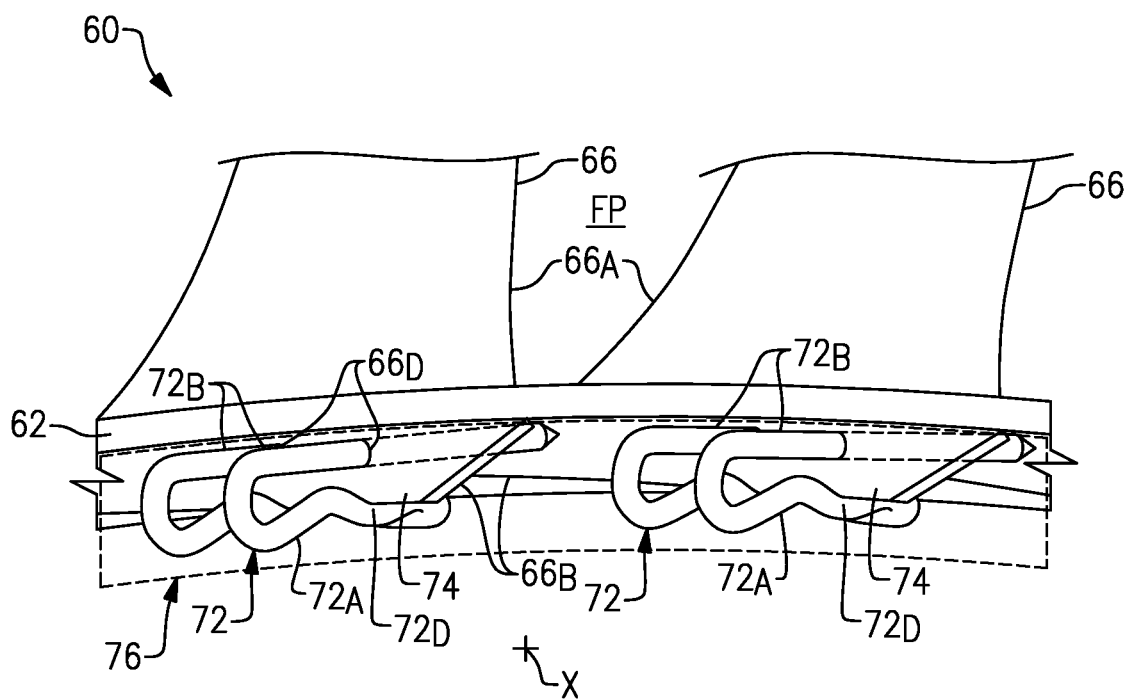
FIG. 3 illustrates a perspective view of an inner diameter portion of the stator assembly of FIG. 2.

The stator assembly 60 includes an inner (or first) shroud 62 and an outer (or second) shroud 64 each extending about an assembly axis X to bound a flow path FP (FIGS. 2-3). The flow path FP may correspond to a portion of the bypass flow path B and/or the core flow path C, and the assembly axis X may correspond to the engine central longitudinal axis A in FIG. 1, for example. The stator assembly 60 includes an array of airfoils 66 that are arranged circumferentially about the assembly axis X to guide or direct flow through the flow path FP. Each of the airfoils 66 includes an airfoil body 66A that extends between a first end portion 66B (FIGS. 2-3) and a second end portion 66C (see FIG. 4).

Figure 5:
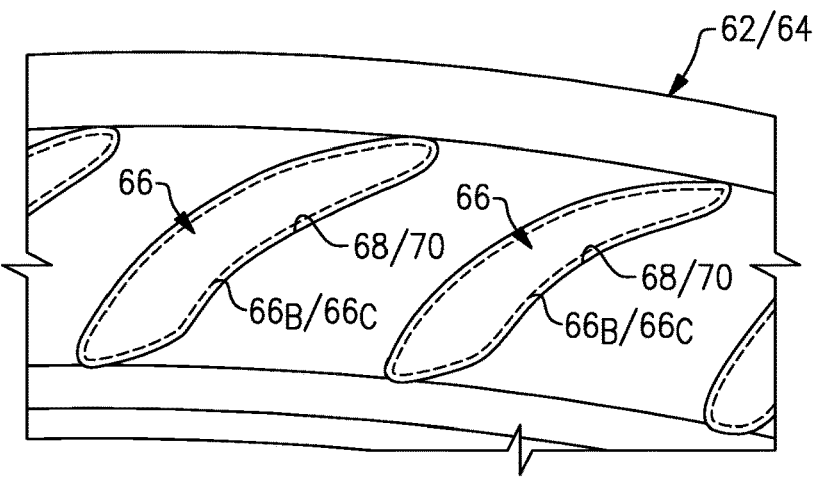
FIG. 5 illustrates a portion of a shroud of the stator assembly of FIG. 2.

The inner shroud 62 defines an array of inner (or first) shroud openings 68. The outer shroud 64 defines an array of outer (or second) shroud openings 70 (FIG. 2). As illustrated by FIG. 5, the shroud openings 68, 70 can be generally contoured relative to a perimeter of respective first and second end portions 66B, 66C of the airfoils 66 (shown in dashed lines).

The shroud openings 68, 70 receive respective first and second end portions 66B, 66C of the airfoils 66. For example, the inner shroud 62 can be positioned relative to the assembly axis X, with each of the airfoils 66 moved in a radially inward direction to be received in one of the first shroud openings 68. Thereafter, the outer shroud 64 can be moved radially inward to position the second end portion 66C of the airfoils 66 in the second shroud openings 70.

Figure 6:
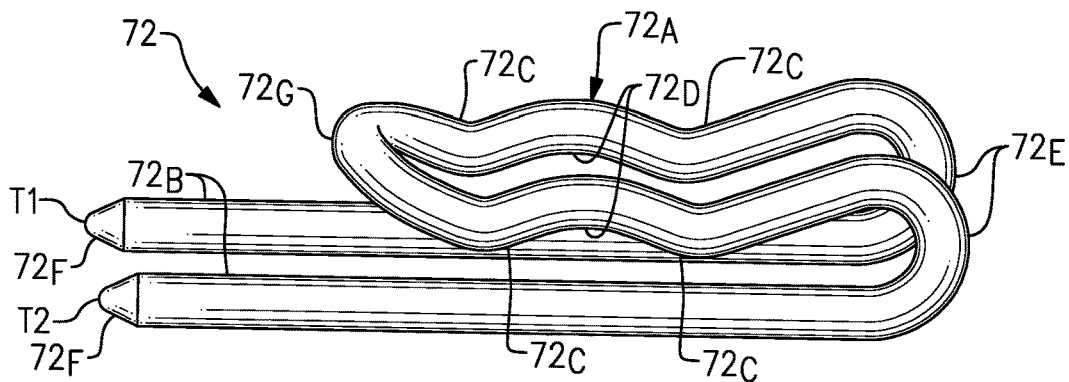
FIG. 6 illustrates a retention clip.

Referring to FIG. 6 with continued reference to FIGS. 2-5, the stator assembly 60 includes a plurality of retention clips 72 for selectively securing the airfoils 66 to the inner shroud 62 and/or the outer shroud 64. In the illustrated example of FIG. 3, the first end portion 66B of each airfoil 66 is mechanically coupled to the inner shroud 62 using one or more retention clips 72. The second end portion 66C can be mechanically coupled to the outer shroud 64 by one or more fasteners. In another example, the first end portion 66B of each airfoil 66 is mechanically coupled to the inner shroud 62 by one or more fasteners, and second end portion 66C can be mechanically coupled to the outer shroud 64 by one or more retention clips 72 (see FIG. 4). In one example, the first end portion 66B and the second end portion 66C of at least some of the airfoils 66 are mechanically coupled to the inner and outer shrouds 62, 64 by one or more retention clips 72.

Each retention clip 72 includes an intermediate portion 72A connecting a pair of elongated leg portions 72B. The retention clip 72 can be formed from an extrusion process and made of a tempered metal or metal alloy, for example, with retention clip 72 having a substantially uniform cross-section between terminal ends T1, T2 provided by the leg portions 72B and along the intermediate portion 72A. This technique can reduce the cost of fabricating the retention clips 72. Other example techniques for fabricating the retention clips 72 can include a casting or machining process.

The leg portions 72B can be substantially parallel to one another and can have a generally elliptical cross-section. In another example, the leg portions 72B have a generally rectangular cross-section. The intermediate portion 72A is connected to each of the leg portions 72B by a pair of outwardly extending bends 72E. The bends 72E can have a generally C-shaped profile to bias the intermediate portion 72A toward the leg portions 72B and provide a clamping action. The bends 72E can be utilized by the operator to assist in installing and/or uninstalling the retention clip 72.

Figure 7:
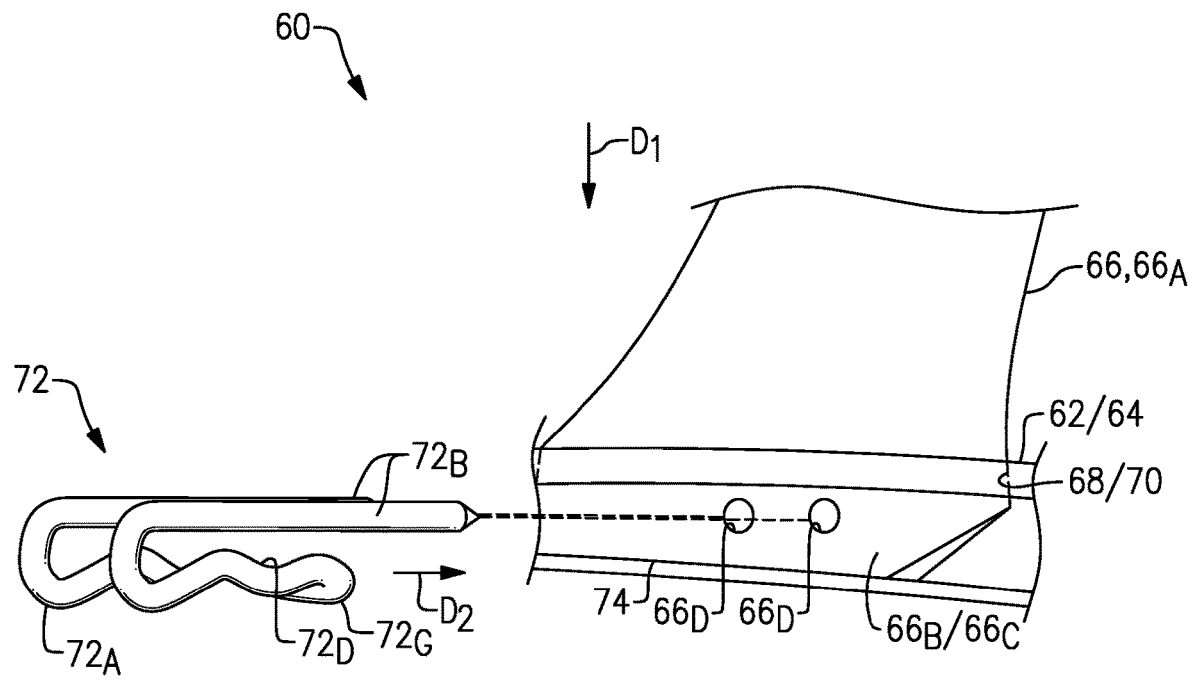
FIG. 7 illustrates an exploded view of a portion of the stator assembly of FIG. 2.

The first and/or second end portions 66B, 66C of the airfoils 66 define a plurality of airfoil openings 66D (FIG. 7). The airfoil openings 66D and respective passages first and through the end portions 66B, 66C can have a generally complementary profile with respect to a cross-section of the leg portions 72B. The leg portions 72B are received in a respective pair of airfoil openings 66D such that the retention clip 72 limits or bounds movement of the respective airfoil 66 relative to at least one of the shrouds 62, 64. Each of the leg portions 72B can have a tapered portion 72F to assist in guiding the leg portions 72B through the airfoil openings 66D. In one example, the tapered portion 72F extends from the bend 72E to the terminal end T2. The airfoil openings 66D can be defined at a position relative to the first and/or second end portions 66B, 66C of the airfoils 66 such that the retention clips 72 are spaced a distance from the respective shrouds 62, 64 to accommodate tolerance stack ups of the stator assembly 60 and reduce a likelihood of corrosion in examples in which the different materials of the components are utilized.

The intermediate portion 72A is contoured to define at least one undulation 72C for engagement with a ridge 74 of one of the end portions 66B, 66C of an adjacent airfoil 66 when the retention clip 72 is located in an installed position. In the illustrated example of FIG. 6, the intermediate portion 72A includes successive undulations 72C such that a side view of the retention clip 72 has a generally "double R" shaped geometry.

Figure 4:
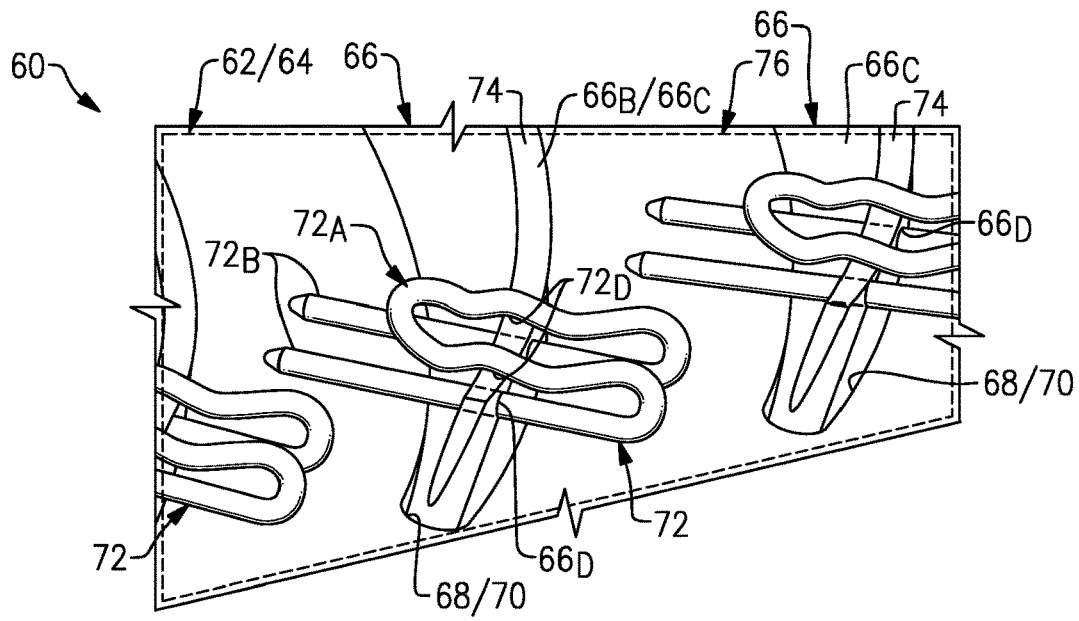
FIG. 4 illustrates a perspective view of the stator assembly of FIG. 2.

The successive undulations 72C define one or more valleys 72D each facing in a direction toward one of the leg portions 72B. The valleys 72D can be dimensioned to sit on the respective one of the ridges 74 (FIG. 4). Each successive pair of undulations 72C can be substantially aligned with a respective one of the leg portions 72B. In other examples, at least some of the undulations 72C can be offset from the leg portions 72B. The valleys 72D can be defined along the intermediate portion 72A such that the leg portions 72B extend through the airfoil openings 66D at a desired distance. In the illustrated example, the valleys 72D are defined such that opposite ends of the leg portions 72B are positioned approximately equidistant from an adjacent ridge 74 to reduce a likelihood of rocking of the retention clip 72 about the ridge 74.

The intermediate portion 72A includes a lateral region 72G defining a generally C-shaped bend connecting the adjacent undulations 72C. The lateral region 72G can be dimensioned to substantially span a distance between the leg portions 72B, and also between the pair of airfoil openings 66D when the retention clip 72 is located in the installed position. The lateral region 72G can be sloped outward relative to the leg portions 72B to provide a ramp for engaging one of the ridges 74. When in the installed position, the retention clip 72 clamps to or otherwise securely engages an adjacent ridge 74 to resist movement of the retention clip 72 relative to the respective shroud 62, 64.

The stator assembly 60 can include one or more secondary retention members 76 (shown in dashed lines in FIGS. 3 and 4) formed adjacent to the end portions 66B, 66C to secure the airfoils 66 to the shrouds 62, 64. Each secondary retention member 76 can include one or more portions arranged about the assembly axis X to define a ring. Each secondary retention member 76 may comprise an elastic material, such as a polymer or other rubber based substance, which may at least partially absorb impacts or dampen vibrations in the surrounding portions of the stator assembly 60. In one example, the secondary retention member 76 is made from a vulcanized silicon rubber.

Material of the secondary retention member 76 can be deposited at suitable locations relative to the stator assembly 60. In the illustrated example, the secondary retention member 76 can be formed in the spaces between the respective shrouds 62, 64, the end portions 66B, 66C and the retention clips 72. The secondary retention member 76 traps or otherwise opposes withdrawal of the retention clips 72 from the airfoil openings 66D, which further reduces the likelihood of the retention clips 72 becoming dislodged from the end portions 66B, 66C and liberation of one or more of the airfoils 66.

Referring to FIG. 7, the retention clip 72 can be installed as follows. The airfoil 66 is moved in a direction D1 such that the end portion 66B/66C is received through the respective shroud opening 68/70. Thereafter, the retention clip 72 is moved in a direction D2 with the leg portions 72B passing through and slideably received in the airfoil openings 66D. The retention clip 72 continues to move in the direction D2 until the lateral region 72G engages the ridge 74 of the airfoil 66. Thereafter, the intermediate portion 72A flexes outwardly and is guided over the ridge 74 until the valleys 72D of the retention clip 72 sit on the ridge 74. The secondary retention member 76 (FIG. 3) can be formed around portions of the retention clip 72 and the end portion 66B/66C of the airfoil 66 to secure the retention clip 72.

To disassemble the stator assembly 60, at least a portion of the secondary retention member 76 can be removed and then the retention clip 72 can be moved in a direction opposite to direction D2 to withdraw leg portions 72B of the retention clip 72 from the airfoil openings 66D. Thereafter, the airfoil 66 can be moved in a direction opposite to direction D1 to remove the airfoil 66 from the shroud opening 68/70.

Figure 8A:
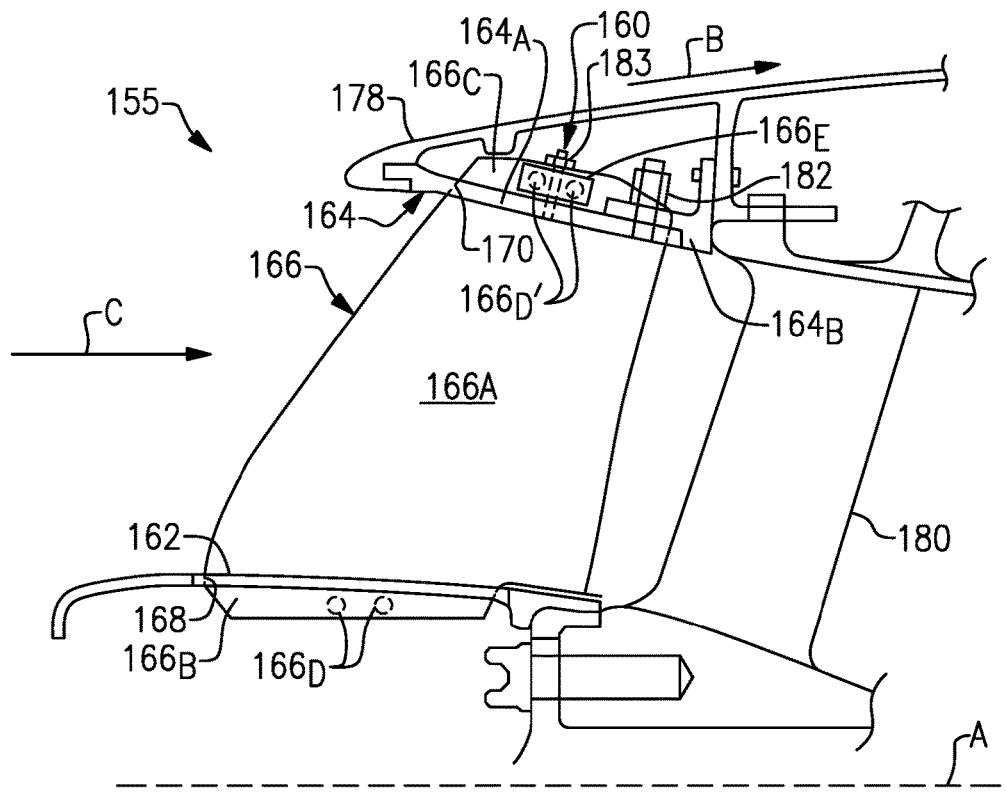
FIG. 8A illustrates an example inlet guide vane assembly.
Figure 8B:
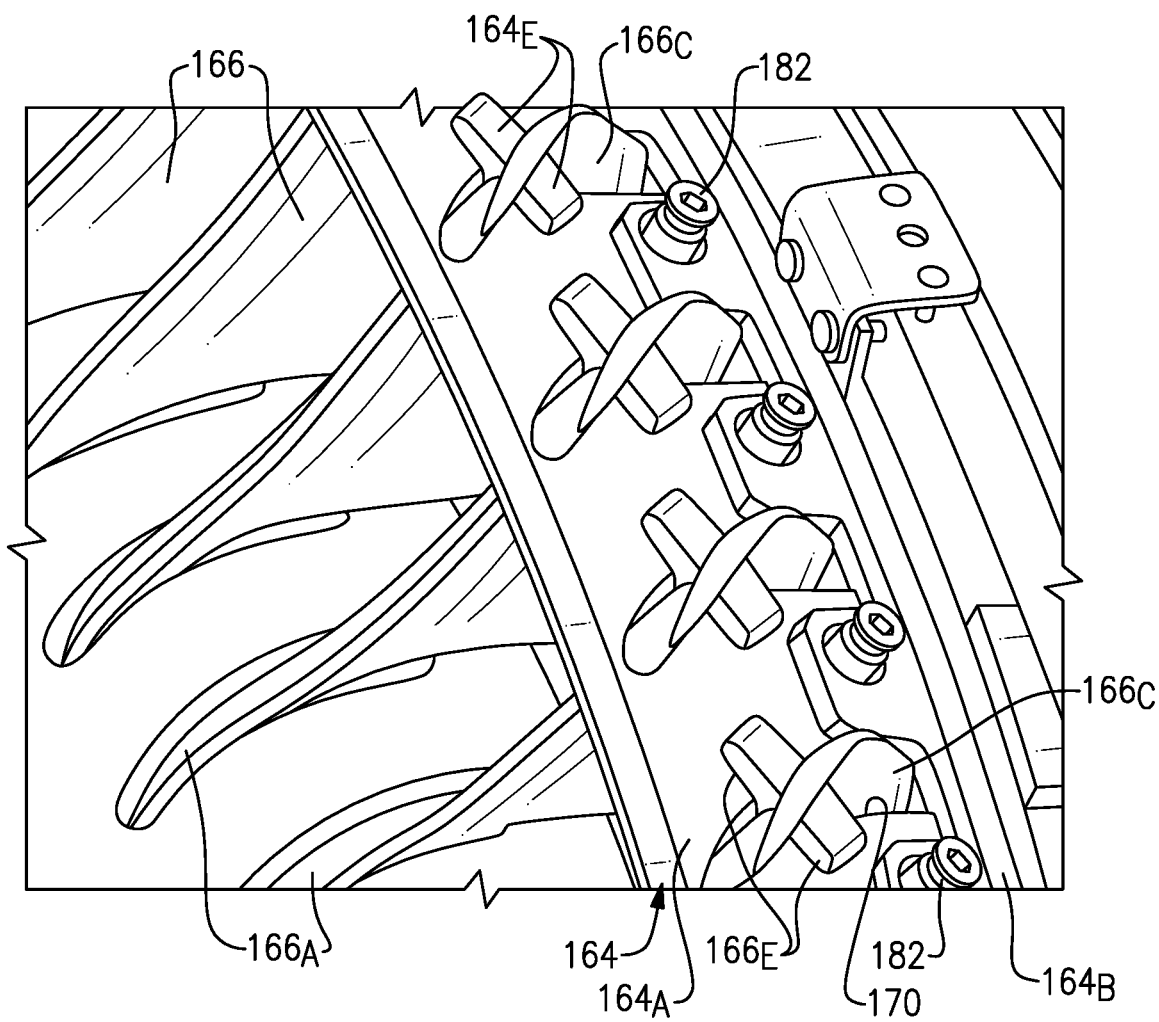
FIG. 8B illustrates a shroud for the inlet guide vane assembly of FIG. 8A.

FIGS. 8A and 8B illustrate an example inlet guide vane assembly 155. The inlet guide vane assembly 155 can be utilized in the engine 20, for example. In the illustrated example, a stator assembly 160 is situated at a splitter 178. The splitter 178 directs airflow to the bypass and core flow paths B, C. The stator assembly 160 can be situated forward of one or more vanes 180 that can be situated upstream of a compressor section, such as the low pressure compressor 44 of engine 20.

The stator assembly 160 includes inner and outer (or first and second) shrouds 162, 164 defining shroud openings 168, 170. One of the end portions 166B, 166C of airfoils 166 (one shown) defines one or more airfoil openings 166D. In the illustrated example of FIG. 8, an inner (or first) end portion 166B of the airfoil 166 defines the airfoil openings 166D. The airfoil openings 166D can be configured to receive a respective retention clip, such as the retention clip 72 of FIG. 6.

The outer shroud 164 can include a forward (or first) portion 164A and an aft (or second) portion 164B mechanically attached or otherwise secured to each other with one or more fasteners 182 (one shown). The forward and aft portions 164A, 164B can each have a generally annular geometry extending about the engine central longitudinal axis A, as illustrated by FIG. 8B. In some examples, the inner shroud 162 can include forward and aft portions similar to the outer shroud 164. In alternative examples, the outer shroud 164 includes a single annular portion (see, e.g., shroud 64 of FIG. 5).

The inner or outer end portions 166B, 166C of airfoils 166 can include an attachment portion such as a set of outwardly extending tabs 166E. One or more secondary retention members (see, e.g., 76 at FIGS. 3 and 4) can be formed adjacent to the tabs 166E. In another example, the tabs 166E are mechanically attached or other secured to the respective inner or outer shrouds 162, 164 with one or more fasteners 183 (one shown in dashed lines in FIG. 8A), such as rivets or bolts and nuts. In some examples, airfoil openings 166D' (shown in dashed lines) can be defined in the outer end portion 166C to receive retention clips, and the tabs 166E can be omitted. The inner end portion 166B and the outer end portion 166C of at least some of airfoils 166 can be secured to the shrouds 162, 164 with one or more retention clips, including any of the retention clips disclosed herein, with one or more secondary retention members (see, e.g., 76 at FIGS. 3 and 4) formed adjacent to each of the end portions 166B, 166C to secure the retention clips.

Figure 9:
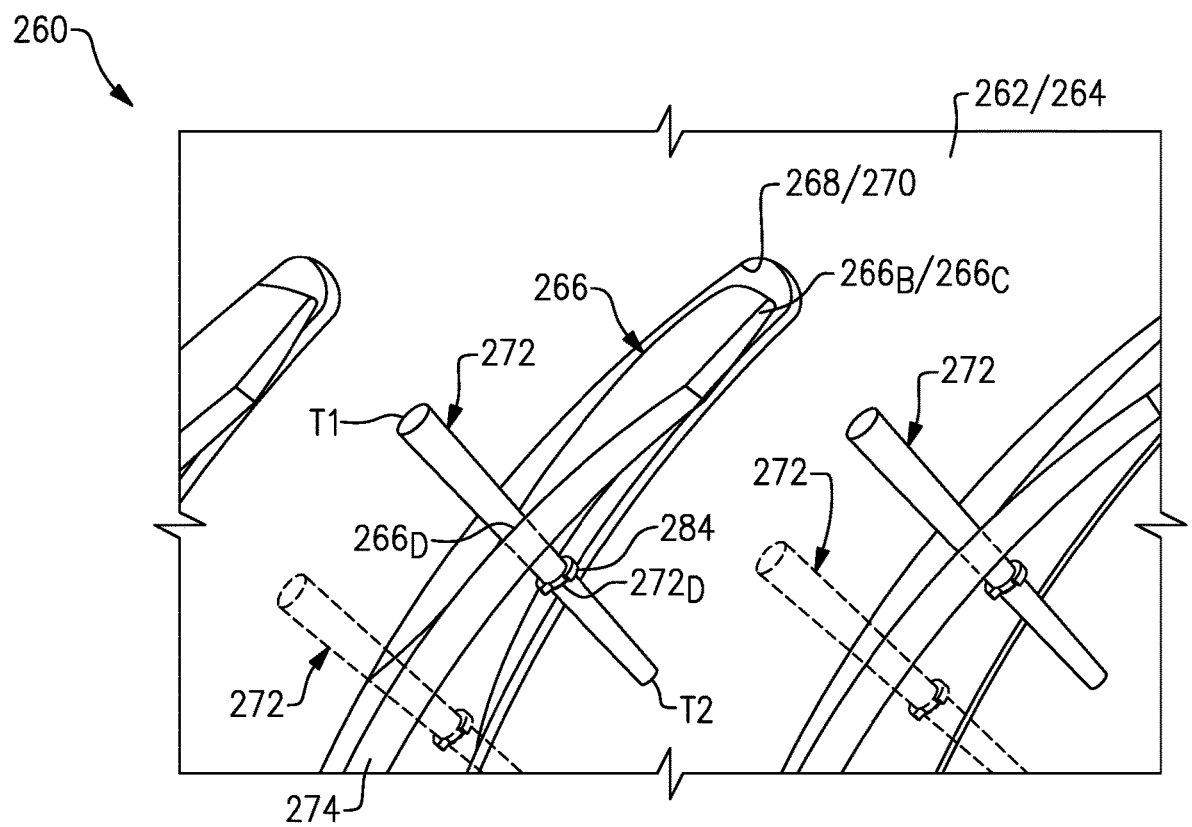
FIG. 9 illustrates a stator assembly according to a second example.
Figure 10:
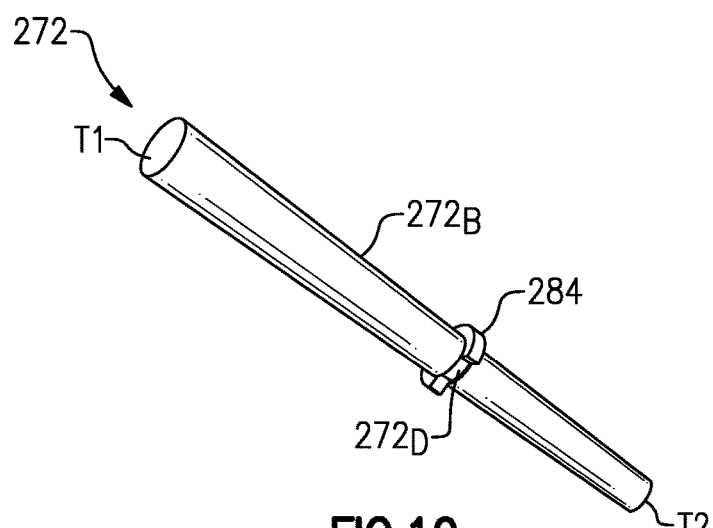
FIG. 10 illustrates a retention clip according to a second example.

FIGS. 9 and 10 illustrate a stator assembly 260 according to another example. The stator assembly 260 includes a plurality of retention clips 272. Each retention clip 272 has an elongated leg portion or body 272B that tapers a distance between first and second ends T1, T2. In the illustrative example, the body 272B defines a substantially continuous taper between ends T1, T2. In other examples, only a portion of the body 272B is tapered. The tapering can be defined such that the ends T1, T2 are positioned approximately equidistant from ridge 274 of the respective end portion 266B/266C.

The retention clip 272 can be moved through a respective one of the airfoil openings 266D until the walls of the body 272B of the retention clip 272 abut against corresponding walls of the airfoil opening 266D. Thereafter, a C-clip 284 (FIG. 10) can be positioned within a race 272D defined by the body 272B of the retention clip 272 to further secure the end portion 266B/266C to the shroud 262/264. Each end portion 266B/266C can include one or more retention clips 272 (the second retention clip shown in dashed lines).

The retention clips 72, 272 disclosed herein can secure airfoils or other components of the engine 20 within relatively small clearances and spaces. The retention clips 72, 272 can also be made in a simplified manner to reduce system complexity.

One or more embodiments have been described. Nevertheless, it will be understood that various modifications may be made. For example, when reengineering from a baseline engine configuration, details of the baseline may influence details of any particular implementation. Accordingly, other embodiments are within the scope of the following claims.

What is claimed is:
1. A stator assembly of a gas turbine engine comprising:
a first shroud extending about an axis to bound a flow path, the first shroud defining a first shroud opening;
an airfoil including an airfoil body extending from a first end portion, the first end portion received in the first shroud opening and defining a pair of airfoil openings; and
at least one retention clip including an intermediate portion connecting a pair of elongated leg portions, the pair of elongated leg portions received in the pair of airfoil openings such that the at least one retention clip limits movement of the airfoil relative to the first shroud, and wherein each leg portion of the pair of elongated leg portions and the intermediate portion have an elliptical cross section.

2. The stator assembly as recited in claim 1, wherein the intermediate portion includes at least one undulation that engages a ridge of the first end portion when the at least one retention clip is located in an installed position.

3. The stator assembly as recited in claim 2, wherein the at least one undulation includes a pair of undulations each substantially aligned with a respective one of the pair of elongated leg portions.

4. The stator assembly as recited in claim 2, wherein the intermediate portion spans between the pair of airfoil openings when the at least one retention clip is located in the installed position.

5. The stator assembly as recited in claim 1, wherein the intermediate portion is connected to each of the pair of elongated leg portions by a pair of C-shaped bends that bias the intermediate portion toward the pair of elongated leg portions.

6. The stator assembly as recited in claim 5, wherein:
the intermediate portion spans between the pair of airfoil openings when the at least one retention clip is located in the installed position;
the pair of airfoil openings are dimensioned to surround an outer diameter of a respective one of the pair of elongated leg portions; and
the intermediate portion includes a lateral region defining a C-shaped bend such that the lateral region is spaced apart from the pair of C-shaped bends.

7. The stator assembly as recited in claim 1, comprising a secondary retention member formed adjacent to the first end portion to trap the at least one retention clip.

8. The stator assembly as recited in claim 7, wherein the secondary retention member comprises an elastomer material.

9. The stator assembly as recited in claim 1, wherein the first shroud bounds a radially inner portion of the flow path, and a second shroud bounds a radially outer portion of the flow path.

10. The stator assembly as recited in claim 1, wherein the stator assembly is situated in a bypass duct.

11. A gas turbine engine comprising:
a fan section including a plurality of fan blades rotatable about an engine axis;
a compressor section in fluid communication with the fan section;
a turbine section driving the fan section; and
a stator assembly comprising:
a first shroud and a second shroud each extending about the engine axis, the first shroud defining an array of first openings, and the second shroud defining an array of second openings;
a plurality of airfoils each including an airfoil body extending between first and second end portions, the first end portion situated in a respective one of the array of first openings, and the second end portion situated in a respective one of the array of second openings; and
a plurality of retention clips each including an intermediate portion connecting a pair of leg portions, the intermediate portion including at least one undulation, and each first end portion receiving a respective one of the plurality of retention clips to limit movement of the plurality of airfoils.

12. The gas turbine engine as recited in claim 11, wherein the stator assembly is situated in a bypass flow path aft of the fan section.

13. The gas turbine engine as recited in claim 11, wherein the stator assembly is an inlet guide vane assembly forward of the compressor section.

14. The gas turbine engine as recited in claim 11, comprising a secondary retention member formed adjacent to each first end portion to trap the plurality of retention clips.

15. The gas turbine engine as recited in claim 11, wherein the first shroud bounds a radially inner portion of a flow path, and the second shroud bounds a radially outer portion of the flow path.

16. The gas turbine engine as recited in claim 15, wherein:
the fan blades drive airflow along a bypass flow path in a bypass duct and drive airflow along a core flow path defined by the compressor section;
the first shroud bounds a radially inner portion of the bypass duct;
the second shroud bounds a radially outer portion of the bypass duct; and
the plurality of airfoils are arranged in the bypass duct axially aft of a splitter relative to the engine axis.

17. The gas turbine engine as recited in claim 16, wherein each leg portion of the pair of leg portions and the intermediate portion have an elliptical cross section.

18. A method of assembling a stator assembly of a gas turbine engine comprising:
providing a shroud defining a shroud opening;
moving an end portion of an airfoil into the shroud opening, the end portion defining a pair of airfoil openings; and
moving a pair of elongated leg portions of a retention clip into the pair of airfoil openings such that the retention clip limits movement of the airfoil relative to the shroud;
wherein the retention clip includes an intermediate portion connecting the pair of leg portions, and each leg portion of the pair of leg portions and the intermediate portion have an elliptical cross section.

19. The method as recited in claim 18, wherein the intermediate portion includes a plurality of undulations.

20. The method as recited in claim 19, wherein the step of moving the pair of leg portions includes simultaneously sliding the pair of leg portions a distance through the pair of airfoil openings such that the plurality of undulations sit along a ridge of the end portion.

21. The method as recited in claim 19, comprising forming a secondary retention member adjacent to the end portion to encase at least a portion of the retention clip and oppose withdraw of the pair of leg portions from the pair of airfoil openings.

22. The method as recited in claim 18, wherein the airfoil is situated in a bypass flow path.

* * * * *